Jan. 18, 1927.
J. M. JOHNSON
1,614,745
SPOTLIGHT MOUNTING
Filed Oct. 31, 1924
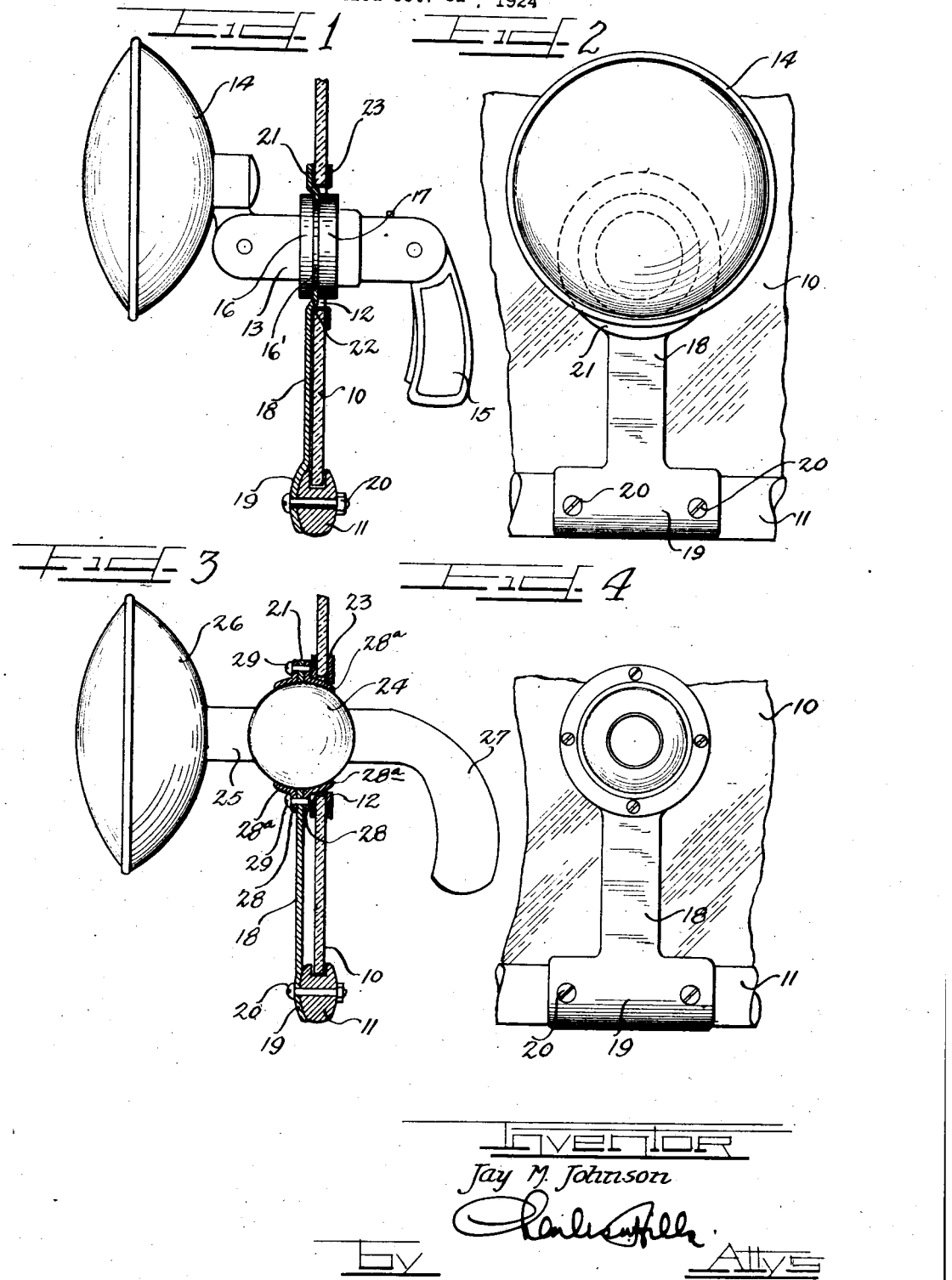
INVENTOR
Jay M. Johnson
By
Attys Patented Jan. 18, 1927.

UNITED STATES PATENT OFFICE.

JAY M. JOHNSON, OF CHICAGO, ILLINOIS, ASSIGNOR TO GREAT LAKES AUTO PRODUCTS COMPANY, A CORPORATION OF ILLINOIS.

SPOTLIGHT MOUNTING.

Application filed October 31, 1924. Serial No. 746,986.

This invention relates to the mounting of spotlights which have heretofore been mounted in and on, and entirely carried and supported by, the glass windshield of an automobile and has for its object the provision of a mounting for such spotlights, which will permit the full operation and functioning of the light but will so support it that none of its weight is carried by the glass of the windshield.

With the above and other objects in view, as will be apparent, this invention consists in the construction, combination and arrangement of parts all as hereinafter described, claimed and illustrated in the accompanying drawing, wherein:

Figure 1 is a vertical section of the present invention showing the same in conjunction with a spotlight in elevation and a windshield in section;

Figure 2 is a front elevation thereof;

Figure 3 is a vertical section of a modified form of the present invention showing the same in conjunction with a ball-and-socket type spotlight in elevation and a windshield in section; and Figure 4 is a front elevation thereof.

Heretofore a certain type of spotlight has been so mounted in a hole in the glass windshield of an automobile that the light has been carried by and supported on the glass to present an operating handle to the operator on the interior and the spotlight on the exterior of the windshield, whereby the manipulation of the handle directs the beam of light emitted from the lamp in any direction within its limits of adjustment. The present invention is designed to mount the spotlight in a hole in the windshield with the handle on one side thereof and the light on the opposite side, in such manner that the hole in the glass is closed against weather and the weight of the light is supported and carried by the frame of the windshield or some adjacent part of the vehicle body and at the same time permit of complete manipulation, functioning and operation of the light.

As shown on the drawings:

Reference being had more particularly to Figures 1 and 2 of the drawings, 10 designates a glass windshield mounted in, and supported by, the frame 11. A hole 12 is provided in the windshield for the reception and passage of a spotlight mounting through the windshield whereby the handle is located upon one side of the windshield and the spotlight is located upon the opposite side of the windshield. In the form of the invention shown in these Figures, 13 designates the lamp stem which passes through the hole and carries a spotlight 14 pivotally mounted on the exterior end thereof and a manipulating handle 15 on the interior end thereof. Suitable mechanism is provided within the stem 13 to swing the light 14 about its pivot by the manipulation of the handle 15, a mechanism of this type being disclosed in the copending application, Serial No. 731,269. Medially of the stem 13 are two clamping rings 16 and 17, the ring 17 being threaded on a flange 16' formed from the ring 16, said rings being designed to engage the supporting structure for the light therebetween. As will be seen from Figure 1, the hole 12 in the glass is of a diameter greater than the diameter of the rings 16 and 17 so that when the light is in position, the rings 16 and 17 pass through and rest in the aperture or hole 12. A vertical supporting arm 18 having a transverse bracket plate 19 at its lower end, is secured to the frame 11 of the windshield, by the bolts or screws 20, piercing the bracket plate 19 and the frame 11 of the windshield, in such manner that the vertical supporting arm rests adjacent and parallel to the outer face of the windshield. At its upper end this supporting arm carries a circular plate 21 aligned with the hole 12 in the glass 10 and offset inwardly to project into said hole. This plate 21 is pierced by an aperture sufficiently large to receive the flange 16' whereby the clamping rings 16 and 17 are brought together through the threaded connection between the ring 17 and flange 16' to grip and engage the plate 21, and that portion 22 thereof, offset inwardly, is positioned somewhat within the opening or hole 12. A channel washer 23 of comparatively resilient material embraces the marginal edges of the aperture or hole 12 so that the offset portion 22 of the plate 21 will contact therewith and rest thereon, thereby protecting the marginal edges of the glass and maintaining a weatherproof closure therefor.

In the form of the invention shown in Figures 3 and 4 a modification of the present invention designed to mount an adjustable spotlight of the character heretofore referred to utilizing a ball-and-socket joint for the adjustment thereof, is shown. In this form of the invention the windshield 10 is provided with an aperture 12 of sufficient diameter to receive the ball 24 which is carried by the lamp stem 25. At one end of the lamp stem 25 is the lamp 26 and at the opposite end is the handle 27, manipulation of the handle resulting in the oscillation of the ball 24 in its bearing and the consequent adjustment of the lamp 26. A supporting bar 18 is provided which is secured to the windshield frame 11 by the bracket plate 19 pierced by the bolts or screws 20 which in turn engage the frame 11. At its upper end the arm is provided with an apertured circular plate 21, the aperture of which is of a diameter sufficient to receive the ball 24; clamping rings 28 secured to each side of the plate 21 by the screws 29 piercing the plate 21 and the clamping rings 28. These clamping rings have the bearing flanges 28$^a$ extending therefrom and curved to conform to the contour of the sphere or ball 24. In this manner when the ball is mounted between the rings 28 with the curved flanges 28$^a$ thereof engaging the surface of the ball or sphere 24 the ball is firmly supported by the arm 18 and ring 21 so that it may be adjusted by the handle 27 but at the same time have its weight carried by the frame 11 of the windshield.

The marginal flanges of the hole 12 in this form of the invention are embraced by the channel washer 23 as in the form of the invention shown in Figures 1 and 2, and the bearing flange 28$^a$ of the inner clamping ring 28 contacts with and bears upon this channel washer to constitute a seal or closure for the hole or opening 12.

It is manifest that the spotlights shown function in exactly the same manner as they would if mounted on the glass 10 of the windshield but that the weight thereof is supported entirely by the frame 11 of the glass or some other substantial part of the vehicle.

What is claimed is:

1. The combination with a glass windshield having an opening therein, of a frame enclosing the same, a spotlight mounting arranged in said opening, a supporting bar fixed to the frame of the windshield and arranged to rest adjoining and substantially parallel thereto, and means at the free end of said bar for receiving and supporting said spotlight mounting in said opening independently of said glass.

2. The combination with a glass windshield having an opening therein, of a frame enclosing the same, a spotlight mounting arranged in said opening, a supporting bar fixed to the frame of the windshield and arranged to rest adjoining and substantially parallel thereto, a plate at the free end of said supporting bar having an aperture therein registering with the opening in the glass, and means whereby the spotlight mounting may be mounted in said aperture and supported by said bar in the opening in the windshield glass.

3. The combination with a glass windshield having an opening therein, of a frame enclosing the same, a spotlight mounting arranged in said opening, a supporting bar fixed to the frame of the windshield and arranged to rest adjoining and substantially parallel thereto, a plate at the free end of said supporting bar having an aperture therein registering with the opening in the glass, means whereby the spotlight mounting may be mounted in said aperture and supported by said bar in the opening in the windshield glass, and a weatherproof seal between said plate and the windshield glass.

In testimony whereof I have hereunto subscribed my name.

JAY M. JOHNSON.